S. S. EVELAND.
BALL BEARING FOR VERTICAL SHAFTS.
APPLICATION FILED DEC. 6, 1907.

935,648.

Patented Oct. 5, 1909.

WITNESSES:
Rob't R. Kitchel.
Frank E. French

INVENTOR
Samuel S. Eveland,
BY
Augustus B. Stoughton
ATTORNEY.

SAMUEL S. EVELAND, OF PHILADELPHIA, PENNSYLVANIA.

BALL-BEARING FOR VERTICAL SHAFTS.

935,648.   Specification of Letters Patent.   Patented Oct. 5, 1909.

Application filed December 6, 1907. Serial No. 405,366.

*To all whom it may concern:*

Be it known that I, SAMUEL S. EVELAND, a citizen of the United States, residing at the city of Philadelphia, in the county of Philadelphia and State of Pennsylvania, have invented certain new and useful Improvements in Ball-Bearings for Vertical Shafts, of which the following is a specification.

The principal object of the present invention is to provide a compact, reliable and comparatively inexpensive bearing suitable for use in connection with among other things vertical rotary converters and motors and in which the ball bearings which carry end and side thrusts shall be fully lubricated.

Figure 1:
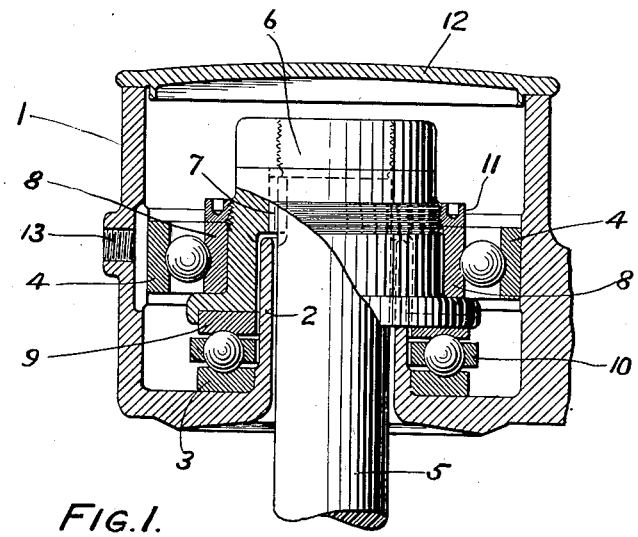
Figure 2:
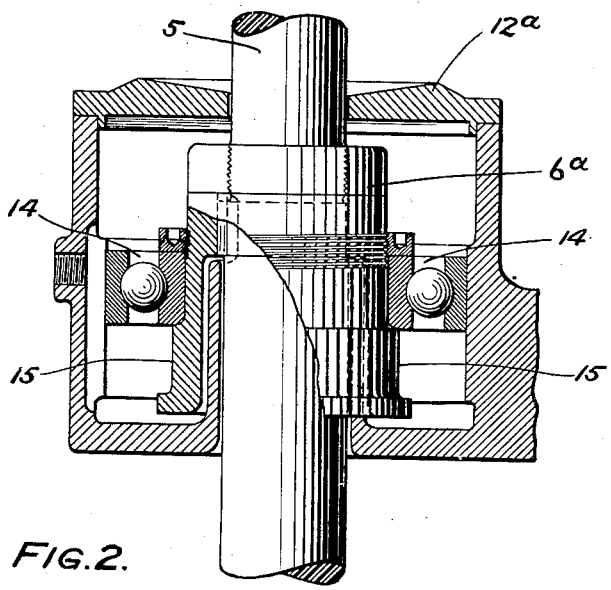

In the drawings, Figure 1, is a view, principally in central section, illustrating the upper bearing or part of the bearing, and Fig. 2, is a similar view illustrating the lower bearing or part of the bearing.

In the drawings 1, is a housing having cylindrical internal walls and also having a tubular neck 2, extending upward and inward from an opening in its base. Externally the neck and the adjacent portion of the base of the housing constitute a seat for the hard washer 3. The internal cylindrical wall of the housing is raised and constitutes a seat for the outer ring 4, of the annular bearing. Through the neck 2, extends the shaft 5.

6, is a nut or cap rigidly connected to the shaft, as shown, by means of a slot and key 7. Externally the cap is outwardly and downwardly flanged at its base so as to provide a depending portion which encircles the upper end of the neck. On top of the flange is a seat for the inner ring 8, of the annular bearing and beneath the flange is a seat for the hard washer 9, of the thrust bearing 10.

11, is a ring attached to the cap 6, as by a screw-thread and serving to hold to place the inner ring 8, of the annular bearing.

12, is a cover for the housing or casing 1, which is properly fixed and supported.

13, is an opening by means of which the oil which fills the bottom part of the housing 1, included between its cylindrical wall and the wall of the neck, is introduced to a height sufficient for lubricating both the thrust and the annular bearing. The top of the neck is sufficiently high to maintain the proper level of oil for accomplishing this purpose.

The construction and arrangement of the part of the bearing shown in Fig. 2, is substantially the same as is shown in Fig. 1, except that the cover 12$^a$, and the cap or nut 6$^a$, are provided with openings through which the shaft 5, extends. Furthermore the thrust bearing is omitted as are also the seats shown in Fig. 1, for its reception. The nut 6$^a$, is provided as in Fig. 1, with a seat for the annular bearing 14, and it is also provided with a seat 15, which may be used for a second annular bearing which it is not necessary to show and which is not infrequently omitted in practice.

What I claim as new and desire to secure by Letters Patent is:

1. A bearing for vertical shafts comprising, an annular ball bearing, a housing internally provided with a cylindrical seat for the outer ring of the annular bearing and equipped through its base with an upwardly extending tubular neck which in conjunction with its side walls constitutes an oil well space in which the annular bearing is arranged, a nut or cap adapted for attachment to a shaft and provided with a depending flange that encircles the neck and is externally provided with a seat for the inner ring of the annular bearing, and a locking ring applied to the nut or cap and serving to secure said inner ring in place upon its seat, substantially as described.

2. A bearing for vertical shafts comprising, a housing having a tubular neck extending upward and inward through its base and constituting in conjunction with the housing floor a seat for one member of a thrust bearing and also in conjunction with the walls of the housing an oil well space, a nut or cap having a depending flange constituting a seat for the inner ring of an annular ball bearing and a seat for the other member of a thrust bearing, a thrust bearing arranged in the oil well space, and an annular bearing interposed between the housing and nut and arranged in the oil well space, substantially as described.

3. A bearing for vertical shafts comprising, a housing having a tubular neck extending upward and inward through its base and constituting in conjunction with the wall of the housing an oil well space, a nut arranged in the housing, an annular ball bearing arranged in the oil well space and interposed between the rim of the nut and the inner wall of the housing, and a thrust bearing encircling the neck and interposed between the under side of the nut and the floor of the housing, substantially as described.

In testimony whereof I have hereunto signed my name.

SAMUEL S. EVELAND.

Witnesses:
W. J. JACKSON,
FRANK E. FRENCH.